United States Patent Office.

HIRAM TUCKER, OF NEWTON, MASSACHUSETTS.

Letters Patent No. 90,892, dated June 1, 1869.

---

IMPROVEMENT IN SURFACING ARTICLES OF CAST-METAL.

---

The Schedule referred to in these Letters Patent and making part of the same.

---

*To all whom it may concern:*

Be it known that I, HIRAM TUCKER, of Newton, in the county of Middlesex, and State of Massachusetts, have invented an Improvement in Surfacing Articles of Cast-Metal; and I do hereby declare that the following is a description of my invention, sufficient to enable those skilled in the art to practise it.

My invention consists in articles of cast-metal which have raised, or salient parts, coated by electro-deposit, and depressed, sunken, or retreating-surfaces, coated with any of the compositions usually known as sealing-wax, or any equivalent therefor, having a resinous base which melts and softens by heat, and which hardens and adheres at all ordinary temperatures of the atmosphere.

In the practice of my invention, the pattern for the casting is so made as to leave in relief the surfaces which are to be covered by an electro-deposit, while, adjacent to said surfaces, the surfaces which are to be covered with wax are sunken.

The castings made from such patterns are first cleansed from sand and other foreign matter, and are then coated with wax in any convenient way; as, for example, the wax, or its equivalent, in granulated, or powdered form, is sprinkled over the casting, which is heated hot enough to cause the wax to fuse and flow into and over the depressed surfaces; or the wax, in form of sticks, may be rubbed over the surfaces to be coated thereby; or a body of wax may be fused, and the cast article, preferably heated to near the temperature of the fused wax, is dipped therein.

The excess of wax is then scraped off from the salient surfaces of the casting, to avoid loss of material, and said surfaces are then polished, preferably by use of rotary grinders and polishers, after which the castings are coated, on their polished or clean metal surfaces, by an electro-deposit.

The lines of contrast thus formed are very clear and distinct, as the electro-deposit does not overlap the wax, or the wax the electro-deposit, and both together thoroughly protect the oxidizable cast-metal base beneath.

Instead of proceeding as before described, the casting, after being cleaned from sand and other foreign matter, is polished on its salient surfaces, and is then coated by an electro-deposit, after which the electro-plated casting is to be heated, and wax applied to the depressed surfaces, on which it will fuse and coat by flowing over them, any surplus being removed afterward from the salient surfaces; or the electro-plated casting may be dipped in melted wax, and the salient surfaces thereof are then afterward freed from the wax, by wiping it off before it cools, or by a scraping, rubbing, or polishing-operation after the wax is cooled, which operation may be that by which the electro-plating has its lustre heightened, by polishing or burnishing.

I claim, as a new manufacture, articles formed with raised and sunken surfaces, by casting, coated substantially as described.

HIRAM TUCKER.

Witnesses:
J. B. CROSBY,
FRANCIS GOULD.